(12) United States Patent
Kamath et al.

(10) Patent No.: US 6,493,209 B1
(45) Date of Patent: Dec. 10, 2002

(54) STACKABLE ELECTROCHEMICAL CAPACITOR CELLS

(75) Inventors: Hundi P. Kamath, Los Altos, CA (US); Paul S. Rasmussen, Livermore, CA (US); Daniel M. Manoukian, Dublin, CA (US)

(73) Assignee: PowerStor Corporation, Dublin, CA (US)

( * ) Notice: Subject to any disclaimer, the term of this patent is extended or adjusted under 35 U.S.C. 154(b) by 0 days.

(21) Appl. No.: 09/536,228

(22) Filed: Mar. 27, 2000

(51) Int. Cl.⁷ .............................. H01G 9/00; H01M 2/00
(52) U.S. Cl. .................. 361/502; 361/508; 361/509; 361/511; 429/163; 429/181
(58) Field of Search ................... 361/502, 525, 361/433, 512, 523, 528, 508, 518, 509, 511; 429/163, 181

(56) References Cited

U.S. PATENT DOCUMENTS

| 4,278,744 A | * | 7/1981 | Athearn | 429/181 |
| 4,766,522 A | * | 8/1988 | McHardy et al. | 361/433 |
| 5,260,855 A | * | 11/1993 | Kaschmitter et al. | 361/502 |
| 5,402,306 A | | 3/1995 | Mayer et al. | 361/502 |
| 5,419,977 A | * | 5/1995 | Weiss et al. | 429/7 |
| 5,527,640 A | * | 6/1996 | Rudge et al. | 429/213 |
| 5,591,540 A | * | 1/1997 | Louie et al. | 429/163 |
| 5,604,660 A | * | 2/1997 | Bai et al. | 361/525 |
| 6,233,135 B1 | * | 5/2001 | Farahmandi et al. | 361/502 |
| 6,270,918 B1 | * | 8/2001 | Wu | 429/56 |

* cited by examiner

Primary Examiner—Dean A. Reichard
Assistant Examiner—Nguyen T Ha
(74) Attorney, Agent, or Firm—Beyer Weaver & Thomas, LLP (57) ABSTRACT

Provided are electrochemical capacitor cells that provide direct external electrical connection to their electrodes and methods for their manufacture. These cells are lightweight, simple and inexpensive to manufacture, and versatile. They may be used alone or they may be stacked to form bipolar stacked capacitors.

24 Claims, 6 Drawing Sheets

STACKABLE ELECTROCHEMICAL CAPACITOR CELLS

BACKGROUND OF THE INVENTION

The present invention relates to electrochemical cells and methods for their manufacture. More particularly, the invention relates to double layer capacitors which provide for direct external electrical connection to their electrodes.

Double layer capacitors include at least one inert, high surface-area electrode and an electrolyte. Their capacitance arises from a separation of charged species at the electrolyte-electrode interface (i.e., the "double layer"); typically the charge separation distance is on the order of atomic dimensions. Particularly, high capacitance double layer capacitors are referred to as "supercapacitors" because of their potentially enormous capacitance (possibly as high as farads or tens of farads per gram). This high capacitance results from a combination of the very small charge separation distance inherent in double layers coupled with a particularly high surface area of the electrodes (often on the order of thousands of meters squared per gram).

A typical double layer capacitor cell contains two electrodes separated by an electrode separator to maintain electrical isolation between the electrodes. These double layer capacitors are charged by applying a voltage across the two electrodes and thereby increasing the total charge stored in the double layer of each electrode. The voltage difference across the two electrodes can continue to increase during charge so long as the leakage current between the electrodes remains low. Ultimately, however, the potential difference between the two electrodes will reach a level where the electrolyte solvent is electrolyzed (introducing a large source of leakage current). Generally, electrolysis of the electrolyte is to be avoided in double layer capacitors because it can cause, among other detrimental effects, loss of electrolyte, increased pressure in the cell, and formation of explosive mixtures (oxygen and hydrogen in the case of aqueous electrolytes).

To attain higher voltages than are feasible in a single double layer capacitor device, multiple double layer capacitors are sometimes connected in series, particularly as "bipolar stacks." Bipolar stacks are generally characterized by a series of cells electrically connected in series through shared electrodes or interconnected electrodes.

Figure 1A:
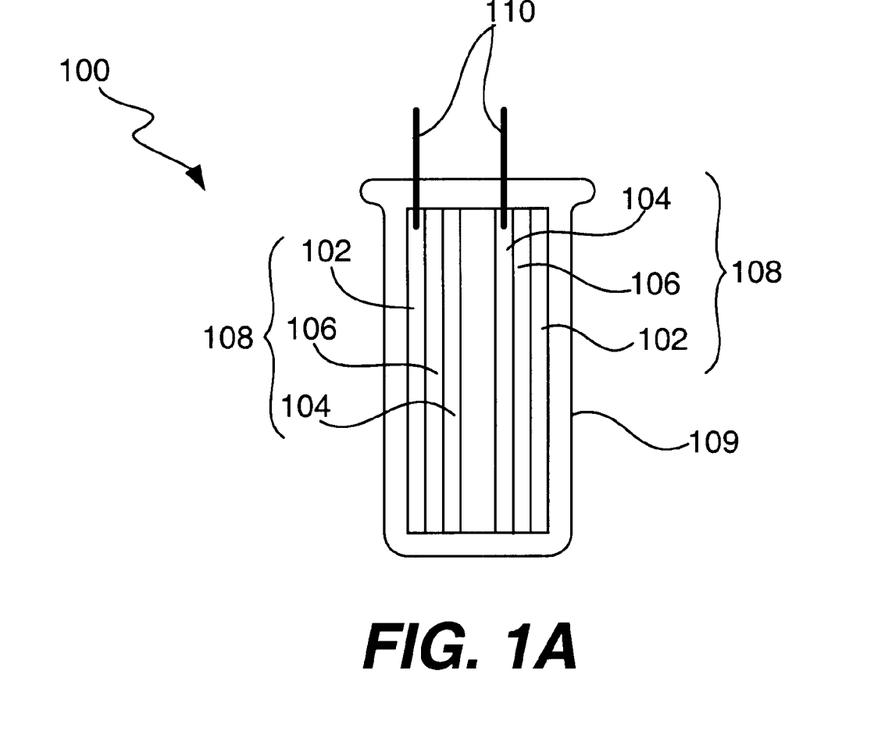
FIGS. 1A and 1B depict cross-sectional views of conventional double layer capacitor package designs.
Figure 1B:
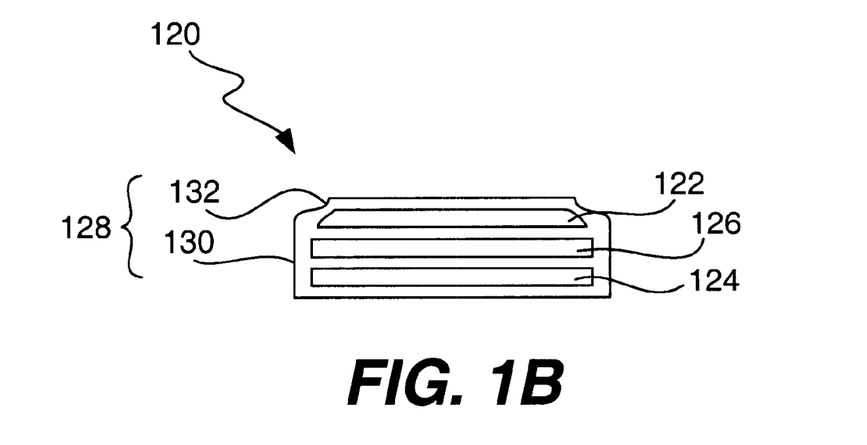

Conventional double layer capacitor devices (whether composed of unitary or stacked cells) are typically packaged in a metal container. FIGS. 1A and 1B illustrate simplified examples of such packages.

FIG. 1A shows a conventional capacitor device package of a metal can with protruding leads. The capacitor 100 is composed of a pair of electrodes 102, 104 separated by a separator material 106 and wound into a roll 109. The separator 106 is typically a porous electrically insulting material, such as polyethylene. An electrolyte (not shown) is also present between the two electrodes, typically permeating the separator. The capacitor components are contained in a metal, typically aluminum or steel, can 108. Leads 110 connected to the two electrodes 102, 104 protrude from the can 108 for external electrical connection.

FIG. 1B shows a conventional capacitor device package of a coin cell. The capacitor 120 is again composed of a pair of electrodes 122, 124, in this case disks, separated by a separator material 126. The separator 126 is typically a porous electrically insulting material, such as polyethylene. An electrolyte (not shown) is also present between the two electrodes, typically permeating the separator. The capacitor components are contained in a metal, typically aluminum or steel, package 128 composed of a case 130 and a cap 132. In this package, rather than protruding leads, where the metal package itself acts as a lead for external electrical connection.

Recently, demand has increased for capacitors with surface mount electrical connections, for example, as back-up power sources in electronic devices. While the conventional capacitor designs may be used to meet this need, alternative designs that are easier and less expensive to manufacture would be desirable.

SUMMARY OF THE INVENTION

To achieve the foregoing, the present invention provides double layer capacitor cells that provide direct external electrical connection to their electrodes and methods for their manufacture. These cells are lightweight, simple and inexpensive to manufacture, and versatile. They may be used alone or they may be stacked to form bipolar stacked capacitors.

In one aspect, the invention provides an electrochemical capacitor cell. The cell includes a cell container, a pair of electrodes provided within the cell container, a separator provided within the cell container and disposed between the two electrodes, and an electrolyte provided within the cell container. The cell container has a plurality of openings exposing a portion of each of the electrodes for electrical contact.

In another aspect, the invention provides an electrochemical capacitor device. The device a device package and a plurality of stacked electrochemical cells provided within the device package. Each of said cells has a cell container, a pair of electrodes provided within the cell container, a separator provided within the cell container and disposed between the two electrodes, and an electrolyte provided within the cell container. The cell container has a plurality of openings exposing a portion of each of the electrodes for electrical contact.

In other aspects, the invention further provides additional electrochemical capacitor devices. One such device includes a device package and a pair of stacked electrochemical capacitor cells provided within the device package. Each of the cells includes a first electrode with a metal current collector, a second electrode, and a separator disposed between the two electrodes. A cell separator is disposed between the second electrodes of the two cells within the device package, and an electrolyte is provided within the device package. The device package has a plurality of openings exposing a portion of each of the first electrodes of the two cells for electrical contact.

Another such device is an electrochemical capacitor device including a device package having a pair of adjacent cavities and a pair electrochemical capacitor cells, one cell provided within each of the plurality of cavities of the device package. Each of the cells includes a first electrode with a metal current collector, a second electrode, and a separator disposed between the two electrodes. An electrical bridge is disposed between the second electrodes of the two cells within the device package, and an electrolyte is provided within the device package. The device package has a plurality of openings exposing a portion of each of the first electrodes of the two cells for electrical contact.

In another aspect, the invention provides another electrochemical device. This device includes a device package having a non-conductive substrate, vias in the substrate connecting to pads on an exterior surface of the substrate, and a metal lid. The device also includes a plurality of stacked electrochemical cells in accordance with the present invention provided within the device package, and electrodes of the cells are electrically connected to pads by the vias. The electrical connection to one of the exterior pads may be provided by the lid.

In yet another aspect, the invention provide a method of a method of making a stackable electrochemical cell. The method involves forming a cavity in sheet of cell container barrier material, punching a hole through the cell container material in the cavity, loading double layer capacitor components into the cavity over the hole, bonding a second sheet of cell container barrier material having a hole over said capacitor components in the cavity, and sealing said cell.

These and other features and advantages of the present invention are described below with reference to the drawings.

DETAILED DESCRIPTION OF PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention provides double layer capacitor cells that provide direct external electrical connection to their electrodes and methods for their manufacture. These cells are lightweight, simple and inexpensive to manufacture, and versatile. They may be used alone or they may be stacked to form bipolar stacked capacitors.

Figure 2A:
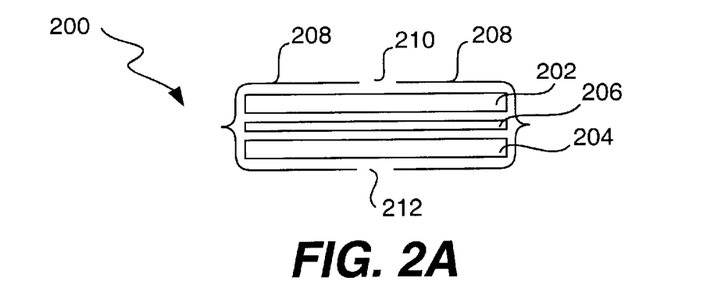
FIGS. 2A–C depict cross-sectional views of unitary and stacked double layer supercapacitor cells, and a packaged cell stack, respectively, in accordance with preferred embodiments of the present invention.

FIG. 2A shows a cross-sectional view of a preferred embodiment of the present invention in which a double layer capacitor cell is provided in a foil "pouch" package. The cell 200 is composed of two electrodes 202, 204. The electrodes 202, 204 preferably, but not necessarily have the same composition. The electrodes may be made from any high surface area, inert, and conductive material. Preferably, however, the electrodes are made from a high surface-area carbon-based material such as activated carbon composites, carbon fiber cloths, carbon power with binders, or carbon fiber cloths with metal fibers. In general, any carbon-based electrode can be "activated" by, for example, controlled oxidation to increase the surface area. Activation techniques are discussed in, for example, U.S. Pat. No. 4,713,731 to Boos et al. which is incorporated herein by reference for all purposes. In addition to carbon-based electrodes, ruthenium oxide ($RuO_2$) based composites (and other electrode materials commonly used in double layer capacitors) may be suitable electrode materials for the present invention.

In particularly preferred embodiments, the electrodes are made from carbon aerogel foams. Such foams have been found to exhibit superior characteristics such as low resistance and high specific capacitance when used in double layer capacitors. Carbon aerogel capacitors are described in U.S. Pat. No. 5,260,855 issued to Kaschmitter et al. and incorporated herein by reference for all purposes. Various modifications of a basic carbon aerogel structure are within the scope of this invention.

In general, carbon aerogels suitable for use with this invention can be made according to the following procedure. First, specified reactants are mixed with a catalyst and may include the addition of metals. The reactants include resorcinol (1, 3 dihydroxybenzene), phenol, catechol, phloroglucinol, or other hydroxybenzene compounds that react in the appropriate ratio with aldehydes (e.g. formaldehyde or furfural). Preferred combinations include resorcinol-formaldehyde, phenol-resorcinol-formaldehyde, resorcinol-formaldehyde, catechol-formaldehyde, and phloroglucinol-formaldehyde. An aquagel which is formed by polymerization is then dried in solvent exchange and extraction steps as is known in the art. The resulting organic aerogel is subsequently pyrolyzed in an inert atmosphere or vacuum to form a carbon aerogel. In alternative embodiments, the pyrolysis atmosphere includes small amounts of hydrogen or other appropriate material which at least partially reacts with the carbon surface.

The aquagels are formed through a sol-gel polymerization of multifunctional organic monomers (mentioned above) in a solvent, typically water, leading to the formation of highly cross-linked, transparent gels. For example, in a preferred embodiment, one mole of resorcinol (1,3-dihydroxybenzene) condenses in the presence of a basic catalyst with two moles of formaldehyde. Mildly basic catalysts such as sodium carbonate are preferred. In this polymerization, resorcinol is a trifunctional monomer capable of adding formaldehyde in the 2-, 4-, and/or 6-ring positions. The substituted resorcinol rings condense with each other to form nanometer-sized clusters in solution. Eventually, the clusters crosslink through their surface groups (e.g., —$CH_2OH$) to form an aquagel A full discussion of the chemistry is not provided here since the specific details are described in depth in U.S. Pat. Nos. 4,997,804 and 4,873,218, which are incorporated herein by reference for all purposes.

The size of the clusters is regulated by the concentration of catalyst in the resorcinol-formaldehyde (RF) mixture. More specifically, the mole ratio of resorcinol (R) to catalyst (C), R/C, controls the surface area and electrochemical properties of the resulting gel. In gels having R/C of 100 and 200, it has been found that electrical conductivity increases significantly with increasing density.

After the aquagel is formed, it must be dried to form the aerogel. In some cases, when the polymerization solvent is removed from the gel by simple evaporation, large capillary forces are exerted on the pores, forming a collapsed structure known as a xerogel. In order to preserve the gel skeleton and minimize shrinkage (and thereby provide an aerogel as opposed to a xerogel), it may be necessary to perform the drying step under supercritical conditions. The details of a suitable supercritical drying procedure as well as other aspects of carbon aerogel preparation are provided in U.S. Pat. No. 5,260,855, previously incorporated by reference. In some embodiments, a xerogel or a composite xerogel/aerogel will be used to prepare the electrodes.

In other preferred embodiments, the aerogel structure is provided by simple drying. Specifically, in cases where the aerogels are of sufficiently high density, such as between about 0.4 and 1.2 g/cc, the pore network may have sufficient inherent strength to withstand the drying process without resort to supercritical drying conditions. In such procedures, a solvent such as acetone may be exchanged with water and then slowly evaporated in air to yield a dry aerogel ready for pyrolysis. Such nonsupercritical drying is particularly attractive because of reduced processing time and cost. Following the solvent exchange/extraction step, the organic aerogel is typically pyrolyzed at elevated temperatures about 1050° C. in a vacuum or inert atmosphere of nitrogen, argon, neon or helium to form carbon aerogels. Choice of pyrolysis temperatures (600° C.–2100° C.) will effect the surface area and physical and chemical structure of the carbon aerogel.

While not wishing to be bound by theory, it is believed that carbon aerogel foams serve as superior double layer capacitor electrode materials because (1) they can be made monolithic carbon structures having low electrical resistance, (2) their pore sizes can be controlled so that all or nearly all available surface area is wetted by the electrolyte, (3) they can be made to have a high surface area density, and (4) they can be provided as chemically pure carbon. In contrast, particulate carbons have higher internal resistances due to interparticle contact resistance and binder resistance. Further, such electrodes may have only a fraction of their available surface area effectively wetted because their pore size distribution extends into a regime where the pore size is on the order of the double layer (i.e., the pores are too small to be effectively wetted). Still further, at such small dimensions, the ionic resistance in the pores may significantly increase.

While it is sometimes preferred to employ a monolithic carbon aerogel as an electrode material (for the reasons described above), other forms of carbon aerogel are also suitable for some applications. These include (1) microsphere carbon aerogels formed by emulsion polymerization, and (2) crushed carbon aerogels. These materials may be provided with binders on a metallic substrate to form electrodes. A particularly preferred electrode material for use in the present invention is carbon aerogel disks. These disks may be of any desired shape. Preferred embodiments include circular and rectangular disks about 5 to 100 mm, more preferably about 5 to 50 mm, in their largest dimension.

The cell 200 also includes an ionically conductive electrode separator 206 to maintain electrical isolation between the individual electrodes of each cell. Electrode separators should be distinguished from "cell" separators which are electron conductors and ion insulators and are used to separate individual cells in stacks of cells, as described in more detail below with reference to FIG. 2D. As is known to those of skill in the art, electrode separators prevent the cell electrodes from shorting against each other. Suitable separators may be made from lower polyalkylenes, glass fiber cloth, woven polymeric cloths, capacitor paper, cellulose, etc. A particularly preferred separator for use in the present invention is porous polyethylene or polypropylene about 5 to 70 microns in thickness and with about 30 to 80% porosity.

An electrolyte is also provided in the separator 206 region between the two electrodes 202, 204. Suitable electrolytes for the present invention include nonaqueous electrolytes such as tetraethylammonium tetrafluoroborate ($Et_4N(BF_4)$) salt dissolved in an organic solvent such as propylene carbonate. Other suitable electrolyte compositions for double layer capacitor cells in accordance with the present invention, including solid and gel electrolytes, are known to those of skill in the art.

The electrodes in the cells of the present invention also preferably include or are supplemented by a current collector. The current collectors employed in this invention may generally be made from any of a number of different metals including aluminum, titanium, nickel, nickel alloys, etc. Aluminum (Al) is particularly preferred as it is lightweight, inexpensive, posses high electrical conductivity, and is chemically stable in organic electrolytes relative to other current collector materials. The metal current collectors may take the form of disks, foil sheets or they may be spray deposited, for example, using the techniques described in U.S. Provisional Patent Application Nos. 60/143,189 entitled Method for Attaching Carbon Structures to Metal, filed Jul. 9, 1999, and 60/147,214 entitled Low Resistance Carbon Contact for Use in Electrochemical Double layer Capacitors, filed Aug. 4, 1999, the disclosures of which are incorporated by reference herein for all purposes. When used, they are positioned on the exterior surface of the electrodes, as described in more detail with reference to FIG. 3, below.

Double capacitor cells having the having the components described above are packaged in a cell container composed of a foil "pouch." The foil pouch 208 is substantially gas-impermeable barrier material composed a polymer-laminated metal material that is lightweight and flexible. A particularly preferred pouch material is polymer-laminated aluminum foil, such as product number 96031, available from Pharma Center Shelbyville, Inc, of Shelbyville, Ky. This product has an OPA polymer film laminated to 45 micron thick aluminum foil. On the interior side, the foil has a PET film and extruded sealant layer bonded to it. It is cold-formable, is chemically resistant to highly polar solvents, and seals against ethylene-based materials, and seals to metals such as aluminum, nickel, copper and stainless steel. The fabrication of these cells is described with reference to FIGS. 3A–E, below.

An additional feature of cells in accordance with the present invention is that the electrodes 202, 204 are exposed for direct external electrical connection. Holes 210, 212 are provided in the pouch over each electrode for this purpose. The pouch 208 is preferably sealed to the electrodes 202, 204 around the holes 210, 212 in order to contain the electrolyte within the cell 200.

These cells are composed of relatively inexpensive materials and the manufacturing process for these cells is fast and inexpensive relative to conventional cell manufacturing processes. The cells are vary versatile and can be used or further packaged alone or in combination with other like cells simple by stacking the cells to form bipolar stacks. In a preferred embodiment, each cell is rated at about 2.5 to 3 V, and the cells may be stacked together to increase the voltage (e.g., 2 stacked cells rated at about 5.5 V, 3 cells at about 8 V, etc.).

Figure 2B:
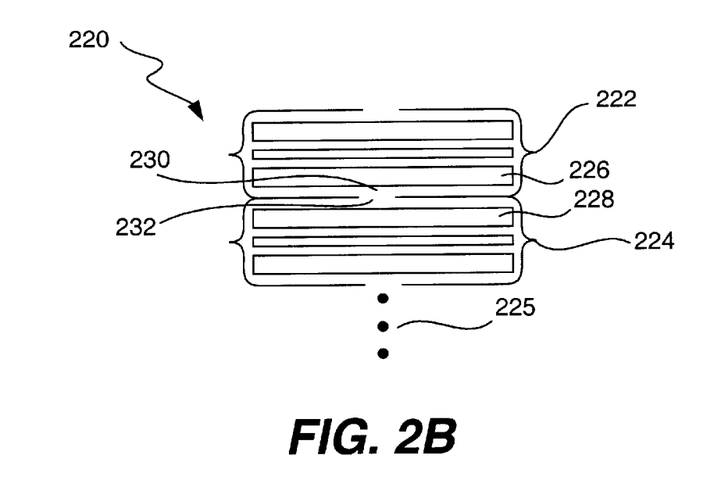

FIG. 2B shows a preferred embodiment of the present invention in which a double layer capacitor cell is provided as a bipolar stack 220. Bipolar stack 220 includes two foil pouch cells 222, 224, such as described above with reference to FIG. 2A. The four electrodes of the individual foil pouch cells 222, 224 reduce to three in the stack 220 as the interior electrodes 226 and 228 are electrically connected by their contact through the aligned holes 230, 232 and effectively become a single electrode shared by the two cells 222, 224 of the stack 220. As noted above, the cells 222, 224 may also include current collectors (not shown) which reduce the resistance to electron flow between adjacent cells.

Bipolar stacks are generally characterized by a series of cells electrically connected in series through shared electrodes. For proper cell functioning, the separator/electrolyte regions must be isolated from one another to maintain a full stack potential. As noted above, this is accomplished in the present invention by sealing the holes 230, 232 to the electrodes 226, 228.

In operation, the cells 222, 224 of the stack 220 may be held together by an adhesive or by contact pressure. The adhesive may be, for example, a conductive epoxy, such as are well known in the art. The pressure may be provided, for example, by an additional package which applies force on the cells to keep them in contact.

Figure 2C:
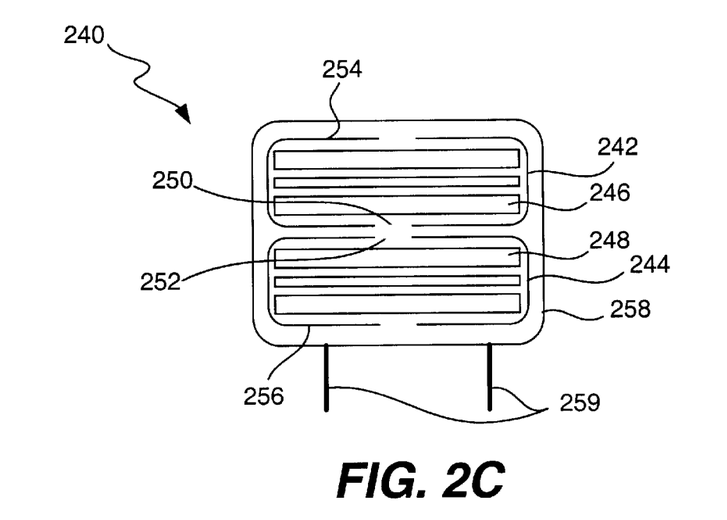

FIG. 2C shows a device package 240 incorporating foil pouch cells in accordance with the present invention in a bipolar stack. The two cells 242, 244 are constructed as described above with reference to FIG. 2B. Interior electrodes 246, 248 are electrically connected by contact through the holes 250, 252 in the two cells' foil pouchs 254, 256 (in order to clearly illustrate the components of the package, the electrodes are not depicted in contact with each other in this figure). In this package, the cells 242, 244 are held in contact by pressure provided by a conventional metal can 258. A conductive adhesive may optionally be applied between the two cells to ensure good electrical contact through the holes 250, 252. Leads 259 connected to the electrodes protrude from the can 258 for external electrical connection.

Figure 2D:
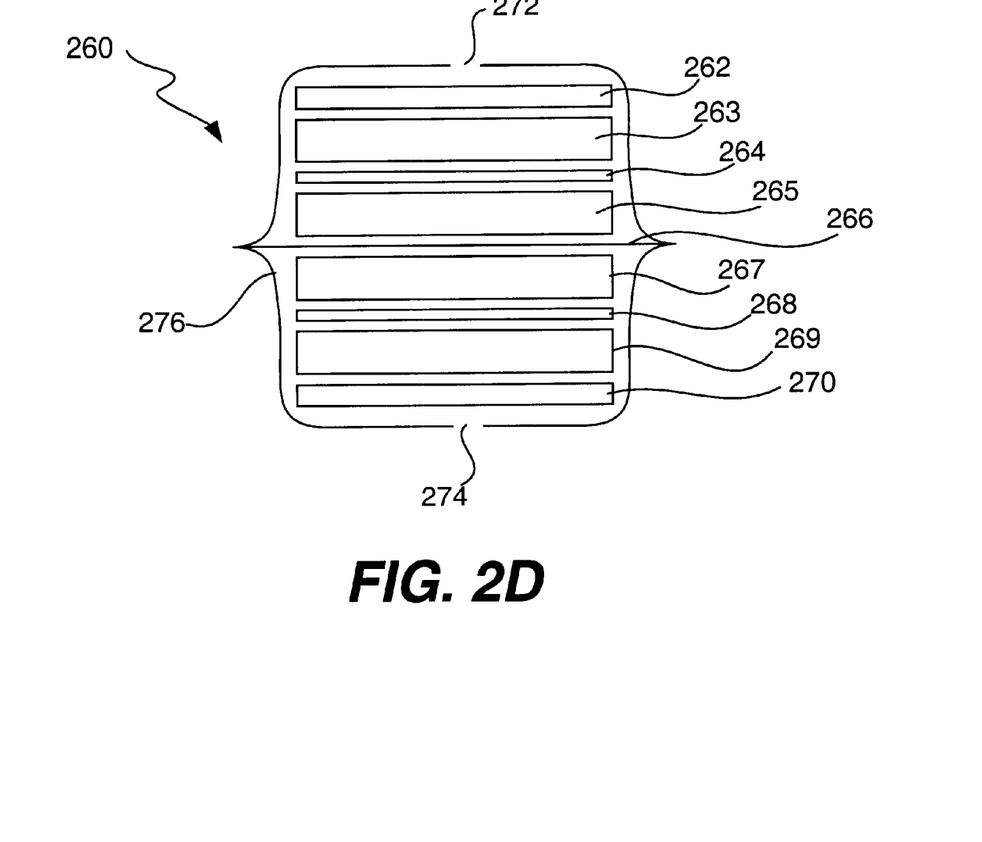
FIGS. 2D and 2E depict cross-sectional views of alternative configurations for a stackable foil-packaged capacitor cell in accordance with preferred embodiments of the present invention.

FIG. 2D illustrates an alternative construction for a bipolar stack of electrochemical (double layer) capacitor cells in accordance with the present invention. In this implementation, two (or more) cells may be combined in a stack within a single foil pouch. The electrochemical device 260 of FIG. 2D has a current collector 262, preferably an aluminum disk, electrically connected to a top exterior electrode 263, preferably a carbon aerogel disk. To enhance the connection, the current collector 262 is preferably bonded to the electrode 263 with a conductive adhesive, such as conductive epoxy.

The top exterior electrode 263 is separated from a top interior electrode 265 of the same composition by a separator 264 composed of an electrically isolating material, for example, polyethylene. An electrolyte, preferably a non-aqueous electrolyte such as tetraethylammonium tetrafluoroborate ($Et_4N(BF_4)$) salt dissolved in propylene carbonate, is also provided in the separator region between the electrodes 263, 265. The top interior electrode 265 is separated from a bottom interior electrode 267 by a cell separator 266 composed of a sheet of metal, preferably aluminum, foil. The cell separator 266 is an electron conductor and ion insulator used to separate the individual cells of the stack. The cell separator 266 may be bonded to each of the adjacent electrodes 265, 267 by conductive epoxy.

The bottom interior electrode 267 is separated from a bottom exterior electrode 269 of the same composition by a separator 268 composed of an electrically isolating material, for example, polyethylene. An electrolyte is also provided in the separator region between the electrodes 267, 269. A current collector 270, preferably an aluminum disk, is electrically connected to the bottom exterior electrode 269, and preferably bonded to the electrode 269 with a conductive adhesive, such as conductive epoxy. It should be understood that the terms "top" and "bottom" are used in this application in a relative sense only and may be reversed or replaced by other relative terms to describe various implementations within the scope of this invention.

The bipolar stack of FIG. 2D is packaged in a cell container 276 composed of a gas-impermeable polymer-laminated metal foil, preferably polymer-laminated aluminum foil, pouch. The container is provided with holes 272, 274 over the top and bottom exterior electrodes, respectively, for direct external electrical connection. The pouch 276 is preferably sealed to the exterior electrodes or, in this case, their associated current collectors 262, 270 around the holes 272, 274, respectively, in order to contain the electrolyte within the cell 260.

Figure 2E:
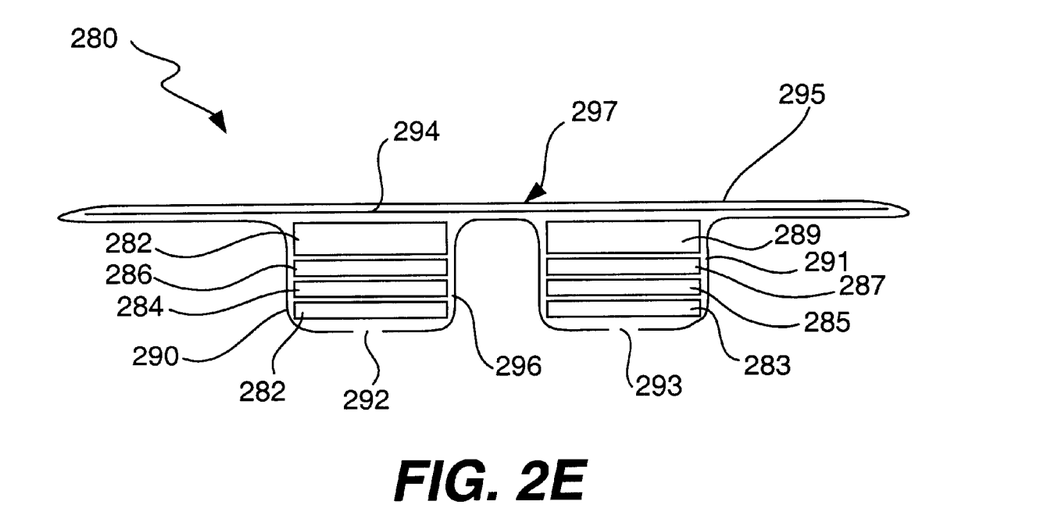

FIG. 2E illustrates another alternative construction for an electrochemical (double layer) capacitor cell in accordance with the present invention. In this implementation, two (or more) cells may be combined and electrically connected with a bridge within a single foil pouch. The electrochemical device 280 of FIG. 2E includes a pair of double layer capacitor cell adjacent to each other in separate cavities of a foil pouch. Each cell has a bottom current collector 282, 283 in a cavity 290, 291, respectively; a bottom electrode 284, 285; a separator 286, 287; a top electrode 288, 289; and electrolyte. The capacitor components of the individual cells are preferably composed of materials as described above with reference to FIGS. 2A–D.

The foil pouch 296 is preferably composed of a substantially gas-impermeable polymer laminated metal, preferably aluminum, foil such as described above. It includes the two cavities 290, 291 in which the individual cells are accommodated. Each cavity has a hole 292, 293 at its bottom to provide for direct external electrical connection to the electrodes 284, 285 via the contact disks (current collectors) 282 and 283. The pouch 296 is preferably sealed to the current collectors 282, 284 around the holes 292, 293 in order to contain the electrolyte within the cell 280. The pouch is completed by a top sheet 295.

Whereas in the embodiment depicted in FIG. 2D provides a cell separator between two vertically oriented cells, this embodiment provides an electrically conductive material 294 laid across the top electrodes 288, 289 of the adjacent cells to bridge the cells and electrically connect them. In a preferred embodiment, the electrically conductive bridge 294 is composed of a sheet of metal, preferably aluminum, foil. In this case, the top sheet 295 of the pouch 296 is preferably sealed to the foil bridge 294 around the holes 297, 298 to contain the electrolyte within the cell 280.

In effect, this embodiment provides a horizontally-oriented bipolar double layer capacitor device. for direct external electrical connection to the electrodes 284, 285 via the contact disks (current collectors) 282, 283, respectively. The package may also, for example, be folded down the center 297 to stack the two cells of the package one on top of the other. This results in a alternative arrangement for a vertically oriented bipolar stack along the lines described above with reference to FIG. 2D.

Figure 3A:
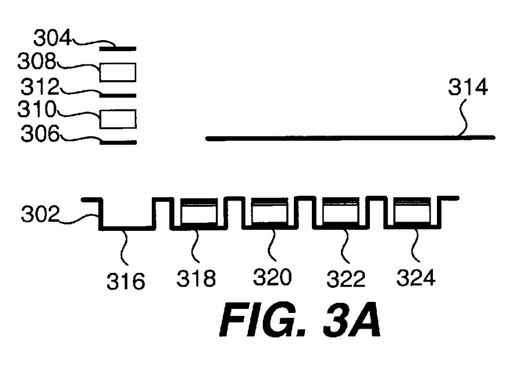
FIGS. 3A–3E depict stages in the fabrication of stackable foil-packaged capacitor cells in accordance with one embodiment of the present invention.
Figure 3B:
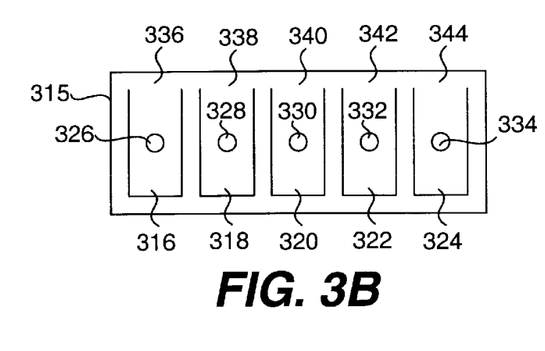
Figure 3C:
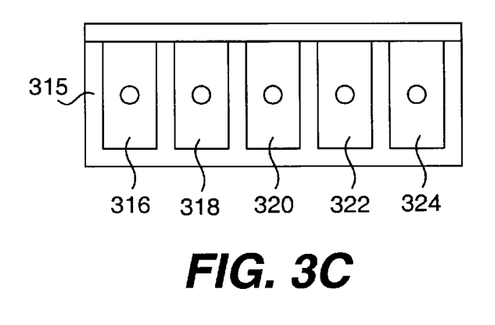
Figure 3D:
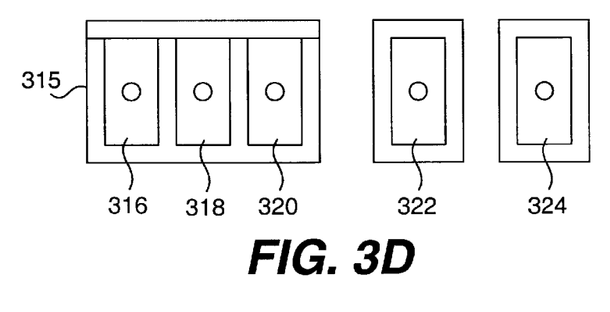
Figure 3E:
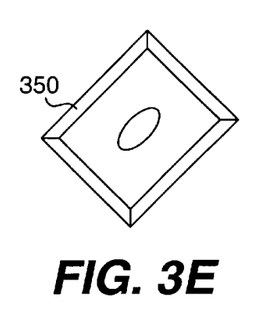
Figure 4:
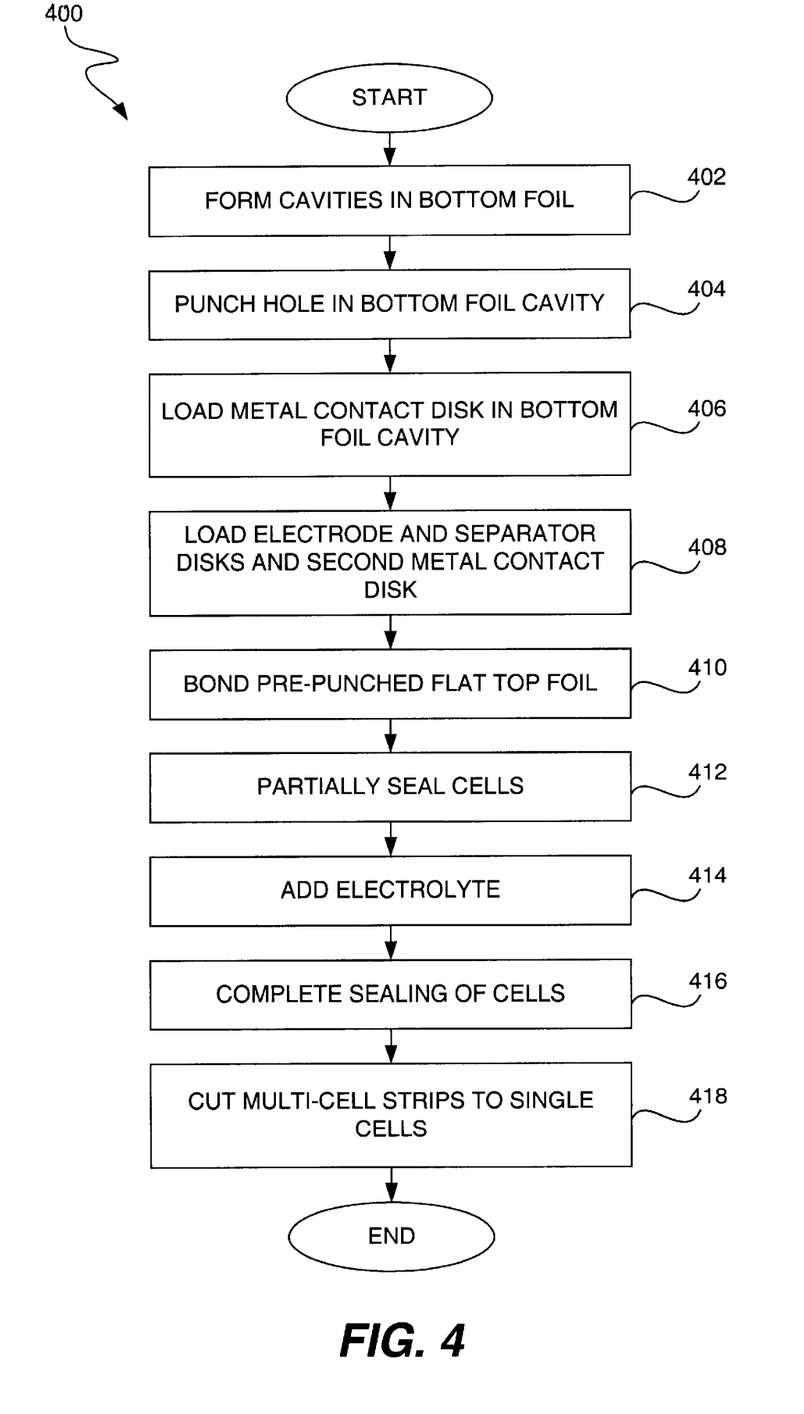
FIG. 4 depicts a flow chart presenting various aspects the fabrication of stackable foil-packaged cells in accordance with one embodiment of the present invention.

FIGS. 3A–E and the associated flow chart of FIG. 4 describe the relatively simple and inexpensive method of manufacturing foil pouch cells providing direct electrode electrical contact in accordance with a preferred embodiment of the present invention. The process may be adapted to manufacture any of the embodiments described herein, as will be apparent to those of skill in the art. Referring the FIG. 4, the process 400 begins with the formation of cavities in a sheet of polymer-laminated metal, preferably aluminum, foil (402). The foil is preferably roughened on one or both sides to enhance adhesion and may be coated with an adhesive on what will be its bottom interior surface. Such a laminated foil product is available from Pharma Center of Shelbyville, Ky. The cavities may be formed by pressing the foil sheet in a die, as is well known in the art.

A hole is then formed, for example, by a punch, in the bottom foil cavity (404). The hole may vary in size depending on the scale of the cell being made.

Typical coin cells in accordance with the present invention are substantially round with a diameter of about 5 to 40 mm. The hole is preferably centered and about 0.5–5 mm, more preferably 1–3 mm, in diameter. Of course, as noted above, the cell and hole may be of any desired shape.

Following hole formation, a metal, preferably aluminum, contact (current collector) disk is loaded into the bottom foil cavity (406). The contact disk may, optionally, be heat-sealed to the bottom foil by heating to a temperature sufficient to melt the polymer in the laminted foil barrier sheet, for example, a temperature of about 120° C. for the Pharma Center product. Then the electrode disks, preferably carbon aerogel disks, and separator disk, preferably polyethylene, and a second metal, preferably aluminum, contact disk are loaded (408).

This portion of the process is also illustrated in FIG. 3A, which depicts a cross-sectional view. The bottom foil 302 is shown die stamped and punched with the cavities and holes formed. The disks that make up the solid components of the cell are shown: the two metal contact disks 304, 306 adjacent to the two electrode disks 308, 310, separated by the separator disk 312. The punched top metal foil 314 is also shown.

Once the disks have been loaded, the pre-punched top metal foil 314 is placed into position over the bottom foil 302 and bonded to the bottom foil using adhesive that is applied or, preferably, adhesive with which the foil has been pre-coated (410). The strip of partially-formed cells then has heat (e.g., about 120° C.) and pressure (e.g., about 80 psi) applied to partially seal each cell (412). As shown in FIG. 3B, in one embodiment the individual cells may be substantially rectangular. In this case the sealing will preferably take place on three of the four sides. It should be understood, however, that the cells in accordance with the present invention may be manufactured to have any desired shape. For example, circular coin cells are another preferred shape. In the case of non-rectangular-shaped cells, a portion of the perimeter of the cells may be left unsealed at this stage of manufacture.

This portion of the fabrication is preferably accomplished in an automated fashion using conventional equipment configured for the purpose in a manner readily apparent to one of skill in the art.

FIG. 3B depicts a top plan view of the strip 315 of partially-formed cells. The individual cells 316, 318, 320, 322, 324 may be seen with the top foil hole 326, 328, 330, 332, 334 for each, and an unsealed side 336, 338, 340, 342, 344 for each, respectively. The strip 315 and, preferably, for efficiency, others like it are placed in a dry environment, for example, less than 5% relative humidity, preferably less than 2% (such an environment may be provided in glove box pressure vessel), and filled with non-aqueous electrolyte, preferably non-aqueous electrolyte, such as tetraethylammonium tetrafluoroborate ($Et_4N(BF_4)$) salt dissolved in propylene carbonate (414). Then, as shown in the plan view of FIG. 3C, the sealing process is completed (416).

It should be noted that a variation on this process allows for the electrolyte to be added immediately after the loading of the disks (408) and for the bonding of the top foil and sealing to take place in a single step. While this reduces the number of processing steps, more of the processing must be conducted in a dry environment which adds complexity.

Once the strips of cells have been sealed, they may be removed from the dry environment and be cut in to single cells (418), as shown in the plan view FIG. 3D. FIG. 3E shown a perspective view of a completed cell 350.

Figure 5:
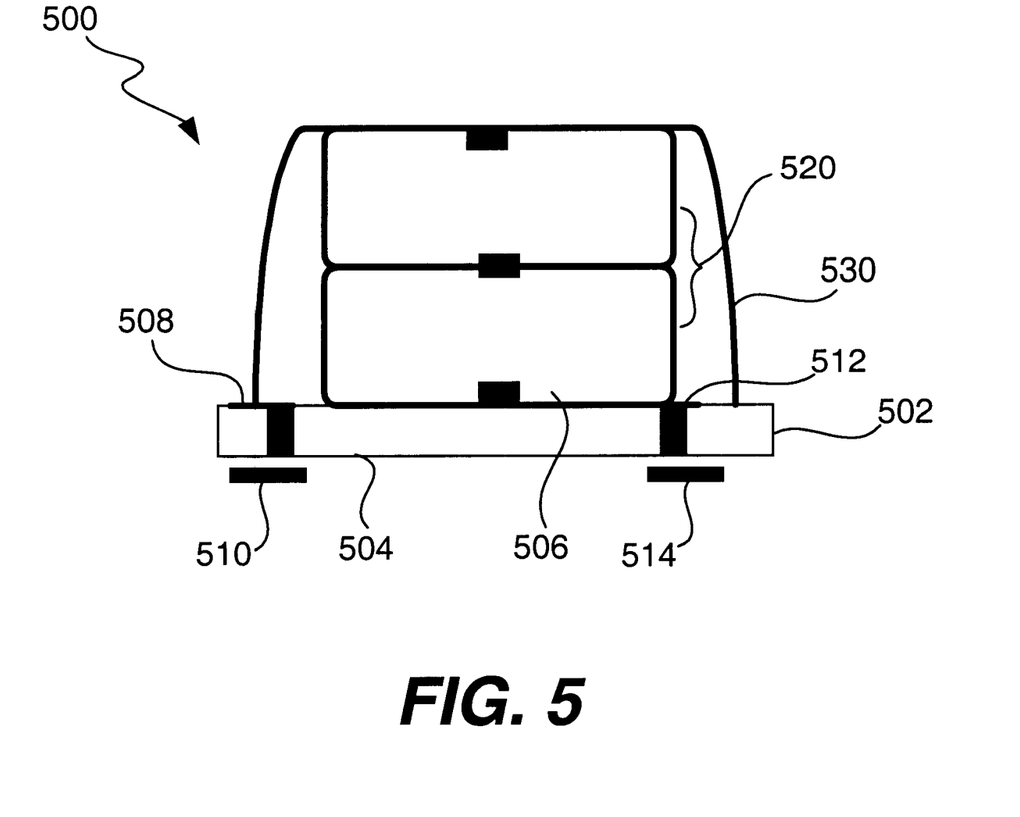
FIG. 5 depicts a cross-sectional view of a surface mount device (SMD) package implementation of supercapacitor cells in accordance with one embodiment of the present invention.

FIG. 5 depicts a surface mount device (SMD) package implementation of supercapacitor cells in accordance with one embodiment of the present invention. This package illustrates the versatility of the cells of the present invention. The device package 500 is composed of a non-conductive substrate 502, composed, for example, of ceramic, FR4, plastic, or another suitable material as are well known to those skilled in the art. The substrate includes a pair of vias 504, 506 connecting pads 508, 510 and 512, 514, respectively, on its opposing surfaces. The interior pad 512 of one via is electrically connected with one electrode of a bipolar stack supercapacitor in accordance with the present invention 520. The interior pad 508 of the other via is electrically connected with another electrode of the bipolar stack by a metal lid 530 that completes the package. The cells of the stack 520 may be held in electrical contact by pressure provided by the connection of the lid 530 to the substrate 502 in the package 500, with or without conductive adhesive. It should be noted that bipolar stack configurations of cells in accordance with the present invention, for example as described with reference to FIGS. 2D and 2E above, may also be packaged as SMDs in this manner.

Such a package is useful for power back-up applications and is easily and inexpensively constructed using as components the foil pouch exposed electrode cells of the present invention. The two pouch cells in series may provide from about 0.47 to 1 F of capacitance at about 5.5 V in a 20×20×8 mm package size.

Although the foregoing invention has been described in some detail for purposes of clarity of understanding, it will be apparent that certain changes and modifications may be practiced within the scope of the appended claims. It should be noted that there are many alternative ways of implementing both the process and apparatuses of the present invention. Accordingly, the present embodiments are to be considered as illustrative and not restrictive, and the invention is not to be limited to the details given herein.

What is claimed is:

1. An electrochemical capacitor device, comprising:
   a device package; and
   a plurality of stacked electrochemical cells provided within the device package, each of said cells comprising, a cell container, a first electrode provided within the cell container, a second electrode provided within the cell container, a separator provided within the cell container and disposed between the two electrodes, an electrolyte provided within the cell container, said cell container having a plurality of openings exposing a portion of each of said first electrodes and second electrodes for electrical contact wherein each of said first electrodes comprises a carbon aerogel disk bonded to an aluminum current collector disk.

2. The device of claim 1, wherein conductive adhesive is disposed between each of the cells of said plurality of stacked electrochemical cells.

3. The device of claim 1, wherein said device package comprises:

a non-conductive substrate;

vias in said substrate connecting to a first pad and a second pad on an exterior surface of said substrate; and a metal lid.

4. The device of claim 3, wherein said metal lid provides an electrical connection between said first electrode and said first pad.

5. The device of claim 4, wherein said non-conductive substrate is one of a ceramic and a plastic.

6. An electrochemical capacitor device, comprising:

a device package, said device package comprising; and a non-conductive substrate;

vias in said substrate connecting to a first pad and a second pad on an exterior surface of said substrate; and a metal lid;

said first and second electrodes being electrically connected to said first and second pads, respectively, by said vias, a pair of stacked electrochemical capacitor cells provided within the device package, each of said cells comprising, a first electrode comprising a metal current collector, a second electrode, and a separator disposed between the two electrodes;

a cell separator disposed between the second electrodes of the two cells within the device package;

an electrolyte provided within the device package;

said device package having a plurality of openings exposing a portion of each of said first electrodes of said two cells for electrical contact.

7. The electrochemical device of claim 6, wherein said cell separator is a sheet of metal foil.

8. The electrochemical device of claim 6, wherein said cell separator is a sheet of aluminum foil.

9. The electrochemical device of claim 6, wherein said plurality of openings are sealed to the current collectors attached to each of said first electrodes.

10. The electrochemical device of claim 6, wherein said cell container comprises polymer-laminated foil.

11. The electrochemical device of claim 8, wherein said polymer-laminated foil is polymer-laminated aluminum foil.

12. The electrochemical device of claim 6, wherein each of said first electrodes comprises a carbon aerogel disk bonded to an aluminum current collector disk.

13. The device of claim 6, wherein said non-conductive substrate is one of a ceramic and a plastic.

14. An electrochemical capacitor device, comprising:

a device package having a pair of adjacent cavities; and a pair electrochemical capacitor cells, one cell provided within each of the plurality of cavities of the device package, each of said cells comprising, a first electrode comprising a metal current collector, a second electrode, and a separator disposed between the two electrodes;

a electrical bridge disposed between the second electrodes of the two cells within the device package;

an electrolyte provided within the device package;

said device package having a plurality of openings exposing a portion of each of said first electrodes of said two cells for electrical contact.

15. The electrochemical device of claim 14, wherein said electrical bridge is a sheet of metal foil.

16. The electrochemical device of claim 14, wherein said cell separator is a sheet of aluminum foil.

17. The electrochemical device of claim 14, wherein said plurality of openings are sealed to the current collectors attached to each of said first electrodes.

18. The electrochemical device of claim 14, wherein said device package comprises polymer-laminated foil.

19. The electrochemical device of claim 18, wherein said polymer-laminated foil is polymer-laminated aluminum foil.

20. The electrochemical device of claim 14, wherein said device is folded between the cells thereby stacking the cells.

21. The electrochemical device of claim 20, wherein said folded device is contained in a package comprising:

a non-conductive substrate;

vias in said substrate connecting to a first pad and a second pad on an exterior surface of said substrate; and a metal lid;

said first and second electrodes being electrically connected to said first and second pads, respectively, by said vias.

22. The device of claim 21, wherein said non-conductive substrate is one of a ceramic and a plastic.

23. An electrochemical device, comprising:

a device package comprising, a non-conductive substrate, vias in said substrate connecting to a first pad and a second pad on an exterior surface of said substrate, and a metal lid; and a plurality of stacked electrochemical cells provided within the device package, each of said cells comprising, a cell container, a first electrode provided within the cell container, a second electrode provided within the cell container, a separator provided within the cell container and disposed between the two electrodes, an electrolyte provided within the cell container, said cell container having a plurality of openings exposing a portion of each of said first and second electrodes for electrical contact;

said first and second electrodes being electrically connected to said first and second pads, respectively, by said vias.

24. The device of claim 23, wherein said non-conductive substrate is one of a ceramic and a plastic.

* * * * *